Sept. 21, 1948. R. H. TAYLOR 2,449,755
ELECTRIC HEATING AND VENTILATING UNIT
Filed Nov. 20, 1945 2 Sheets-Sheet 1
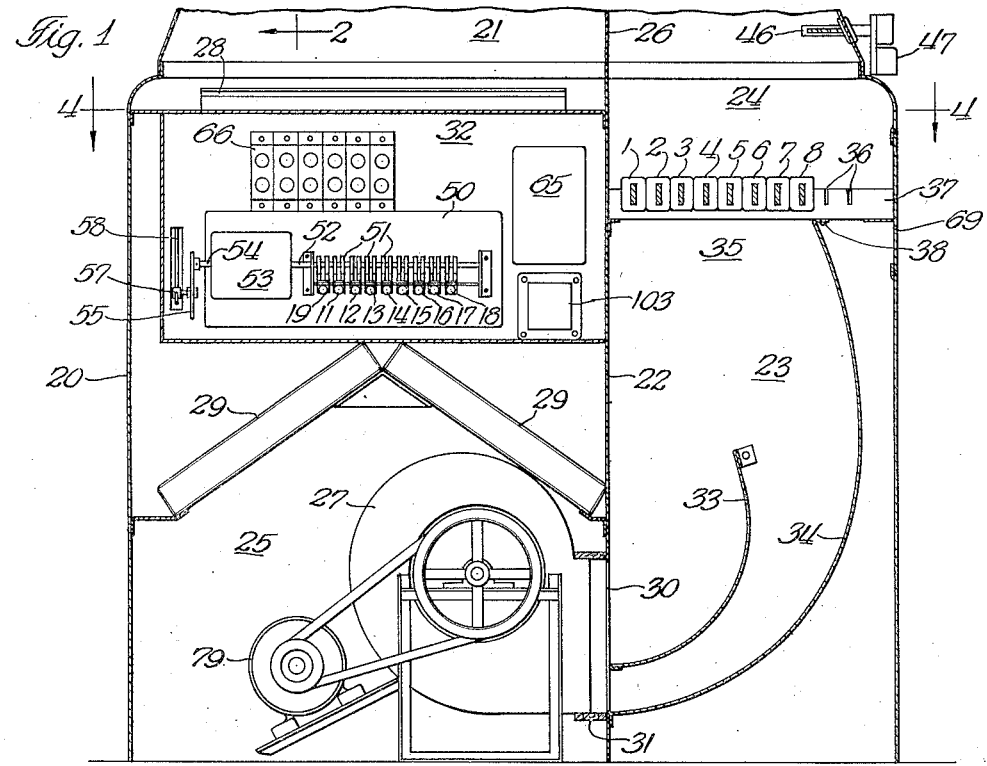
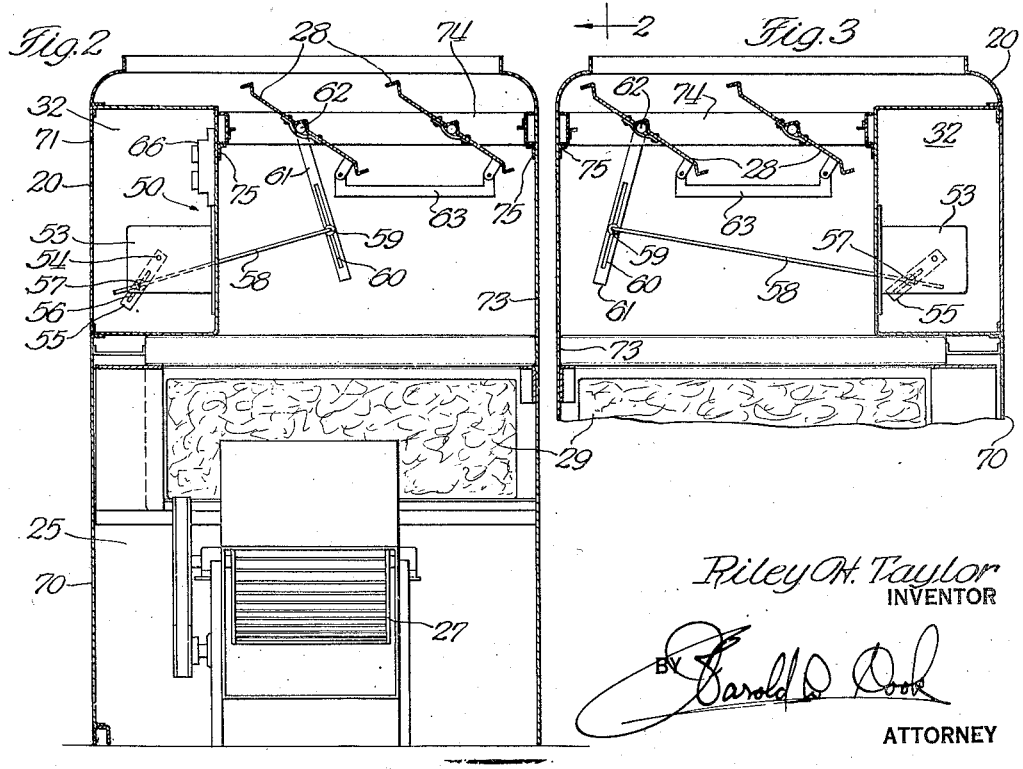
Riley O. H. Taylor
INVENTOR
ATTORNEY Sept. 21, 1948.　　　　R. H. TAYLOR　　　　2,449,755
ELECTRIC HEATING AND VENTILATING UNIT
Filed Nov. 20, 1945　　　　　　　　　　2 Sheets-Sheet 2
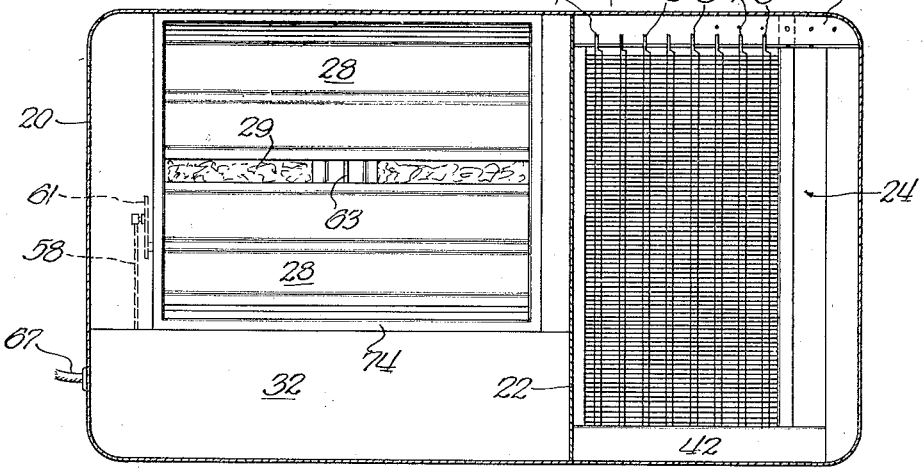
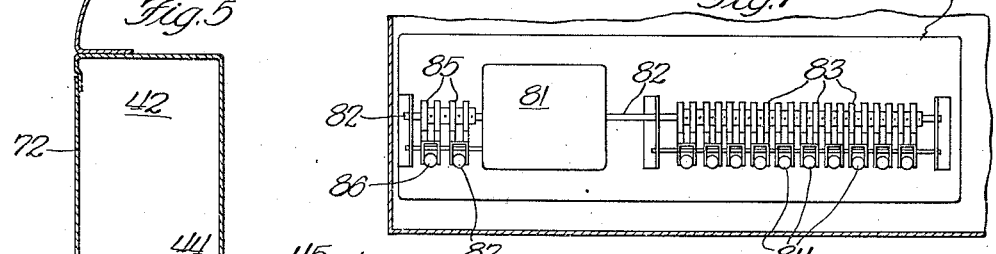
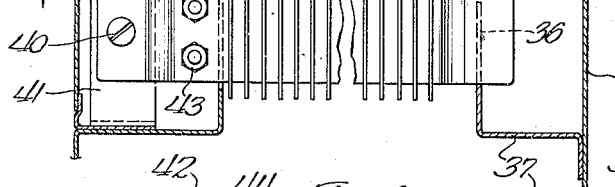
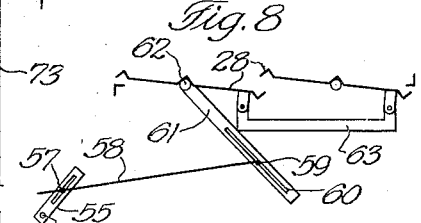
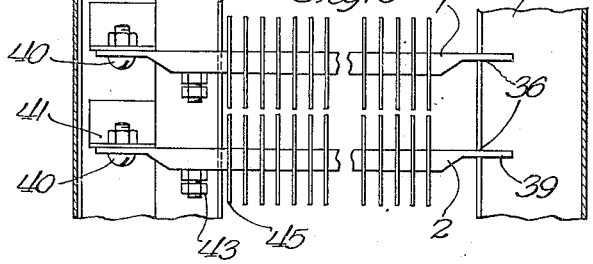
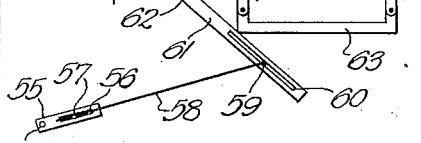
Riley O. H. Taylor
INVENTOR
BY Harold D. Cook
ATTORNEY Patented Sept. 21, 1948

2,449,755

UNITED STATES PATENT OFFICE 2,449,755

ELECTRIC HEATING AND VENTILATING UNIT

Riley H. Taylor, Portland, Oreg.

Application November 20, 1945, Serial No. 629,852

20 Claims. (Cl. 219—39)

This invention relates to an electric heating and ventilating unit for use primarily as a central heating plant for a dwelling house or other building.

The general object of the invention is to provide an electric heating and ventilating unit having a single housing or cabinet containing heating units, blower, and automatic control mechanism, which may be manufactured and installed as a unit to take the place of a conventional fuel burning furnace.

Another object is to provide a furnace cabinet and control unit which may be assembled in either right or left hand relation so that the furnace may be positioned near a wall on one side or the other without interfering with the accessibility of the heating units, blower and control.

Another object is to provide an electric furnace having a heating chamber so designed that the heating units may conveniently be removed and replaced.

Another object is to provide in a furnace of the type described a control unit housing and a terminal housing forming a continuous wiring chamber leading from the external conduit connection to the terminal connections of the heating units.

Another object is to provide an electric furnace which will accommodate various numbers of heating units without varying the size or design of the cabinet.

Another object is to provide a heating chamber having a plurality of heating units so connected and disposed in a throat thereof as to produce a substantially uniform heating effect across the area of the throat at various heat outputs from low heat to high heat.

Another object is to provide a plurality of heating units in a heating chamber in closely spaced side by side relation so that units which are switched off and units which are energized at a low temperature will receive heat from adjacent higher temperature units substantially uniformly to heat an air stream passing through and between the heating units.

Another object is to provide an electric furnace having a controlled air flow over a bank of heating units wherein the air velocity is varied in accordance with the heat output.

Another object is to provide an electric heating and ventilating unit having a modulating heat and damper control to vary the damper opening in accordance with the heat output, and to establish a wider damper opening when all the heating units are switched off than in the lowest heating step of the controller.

Still another object is to provide a safety control for an electric furnace to prevent overheating in the event of failure in the fan or wiring connections.

These and other objects and advantages are attained in the construction and arrangement shown in the accompanying drawings illustrating a preferred embodiment of the invention. The invention may take other forms, however, and all such modifications falling within the scope of the appended claims are included in the invention.

In the drawings:

Figure 1 is a longitudinal sectional view showing a preferred construction of electric heating and ventilating unit embodying the principles of the invention;

Figure 2 is a sectional view taken on the line 2—2 of Figure 1;

Figure 3 is a fragmentary sectional view similar to Figure 2, showing how the cabinet may be assembled as a left hand furnace with certain parts reversed from Figure 2;

Figure 4 is a sectional view in plan, taken on the line 4—4 of Figure 1;

Figure 5 is a fragmentary sectional view through the heating chamber, taken on the line 5—5 in Figure 4;

Figure 6 is a sectional view taken on the line 6—6 of Figure 5;

Figure 7 is an enlarged view showing a control unit for use with a variable speed fan;

Figure 8 is a diagrammatic view showing the partially open position of the dampers when the step controller is in its "off" end position; and Figure 9 is a diagrammatic view showing the closed position of the dampers in the first heating step.

Referring first to Figures 1, 2 and 4, the numeral 20 designates the furnace housing or cabinet which is designed to fit under the bonnet 21 of a conventional fuel furnace. A vertical wall 22 divides the cabinet 20 into two parts, one part constituting a plenum chamber 23, the other part constituting an air return chamber 25. The wall 22 is positioned to form a continuation of a partition 26 in the bonnet separating the hot and cold air ducts which communicate with the space or rooms to be heated and ventilated.

The air return chamber 25 is in communication with the cold air return in the bonnet 21, the air being circulated therethrough by a fan or blower 27 and controlled by a plurality of dampers 28 pivotally mounted in a damper frame 74. For reasons which will presently appear, the damper frame is removably supported on flanged brackets 75 around the inside of the upper portion of the air return chamber. Disposed above the blower are filter units 29 arranged so that the return air is drawn therethrough and delivered through an opening 30 in the wall 22 leading into the plenum chamber. A felt collar or the like 31 is preferably interposed between the blower outlet and the wall 22 to insure quiet operation. Return air descending through the chamber 25 passes alongside a control unit housing 32 containing the electrical heating and damper control mechanism. Further reference will hereinafter be made to the control mechanism.

The return air discharged through the opening 30 is guided upwardly through the plenum chamber 23 by a pair of curved baffles 33 and 34. The upper end of the baffle 34 is adjusted when the furnace is installed to form a throat 35 at the entrance to the heating chamber having a width equal to the bank of heating units which, in the present instance, comprises the units 1 to 8. The heating units are supported at their remote ends in slots 36 in a bracket 37 extending along the rear wall of the furnace as viewed in Figure 1, and a series of holes may be provided on the under side of this bracket to receive a bolt 38 securing the upper end of the baffle 34 adjacent the outer edge of the last heating unit which in this case is unit 8. In this way, the present furnace cabinet may accommodate from five to ten heating units without alteration except to fasten the bolt 38 in the proper hole when the furnace is installed. Thus, when the furnace is installed with only five heating units, the throat 35 would be closed down to approximately half the available width of the plenum chamber, but when ten units are used the throat would extend substantially the whole width of the plenum chamber, whereby different heating requirements may be satisfied by a single standardized cabinet structure by inserting the necessary number of heating units.

As best shown in Figures 5 and 6, each heating unit has a thin end portion 39 which is adapted to rest loosely in a slot 36 to allow freedom for expansion and contraction and to be easily removable. The front ends of the heating units are secured by bolts 40 to individual upstanding brackets 41 in an enclosed terminal housing 42. The other side of the baffle 34 may be attached to the bottom wall of this chamber by a bolt in a selected one of a series of holes so as to be in line with the fastening 38. The numeral 43 designates the electrical terminals of the heating units which are connected to conductors passing through the terminal housing 42 into the control unit housing 32. These conductors and other wiring connections are omitted in the drawings. The terminal ends of the heating units pass through an elongated opening in the form of a horizontal slot 44 in the inner wall of the terminal housing 42, which opening is closed by the end fins 45 on the heating units. The series of heating units are mounted in this manner as closely together as the fins will permit so that the whole length of the opening 44 embraced by the throat 35 is closed by the fins when the heating units are in place whereby the terminal ends of the heating units and the terminal conductors are shielded from the heat of the heating chamber. The numeral 46 designates a bonnet thermostat positioned immediately above the heating chamber and responsive to excessive temperature therein to serve as a safety control for the heating and fan circuits in a manner to be presently described.

The heating units 1 to 8 are energized in different combinations in a sequence of control steps by a plurality of mercury switches 11 to 18 in response to thermostat control, and the system of circuits by which the desired heat output and distribution in each step are accomplished forms the subject matter of my copending application, Serial No. 629,853, filed November 20, 1945, for Electric heating system with modulating control.

The mercury switches 11 to 18 are arranged for operation in sequence by a control unit 50 in the housing 32. The unit 50 comprises a step controller in which the switches are tilted by individual cams 51 on a common cam shaft 52 turned at a slow constant speed by a motor and reduction gear unit 53. Motor 53 is controlled by a potentiometer thermostat in the room or space receiving heat from the furnace, the arrangement being such that unbalance of the thermostat from a selected temperature setting will produce a corresponding amount of rotation of the cam shaft to restore the electrical balance through a variable Wheatstone bridge circuit or the like. The mode of operation is such that as the movable element of the thermostat fluctuates with rising and falling room temperature, the motor 53 follows in the proper direction at a constant speed to rotate the cam shaft 52 to a new position to change the circuit connections to the heating units in accordance with the heat demand of the moment to exert a modulating heat control.

By reason of the close spacing of the heating units, those units which may be completely deenergized, or which may be energized at a low temperature, receive heat from adjacent units which are energized at a higher temperature. In my copending application heating circuits are disclosed for different numbers of units for obtaining a good distribution of heat in different combinations of energized units through a series of control steps, although some of the units are energized at a high temperature and other units are completely deenergized in certain of the control steps. Utilizing the exchange of heat between adjacent heating units in this manner is found to be very effective in providing a uniformly heated air flow throughout a wide range of variation in the total heat output wherein different groups of units are energized in different heating steps. This mode of heating also simplifies the switching connections and tends to reduce the maximum temperature and the operating time of any one unit in the intermediate steps, thereby prolonging and equalizing the life of the units.

In the control unit 50 the step controller includes an additional switch 19 for the circuit of a single speed fan motor 79. The cams for this switch are adjusted to start the fan just prior to energization of the first heating circuit so that fan operation is insured for all heating steps. For controlling the dampers the step controller shaft 52 has an end 54 extending from the opposite side of the motor carrying a crank arm 55 having a radial slot 56. An adjustable pivot 57 in this slot is connected with a link 58 having a similar adjustable pivot 59 in a slot 60 in an arm 61. The arm 61 is secured to a shaft 62 carrying one of the dampers 28, the other damper being connected therewith through a link 63 so that the two dampers will move in unison. The full range of angular movement of the crank arm 55 in the present embodiment is approximately 160 degrees whereby the pivots 57 and 59 and the effective length of the link 58 may be adjusted to produce the desired rate and amplitude of movement of the dampers 28.

The object of the interconnection of the damper and heating control is to provide a substantially constant temperature of the air delivered from the heating chamber. When the heat output is low it is desired to have the air velocity also low so that it will not produce a cold sensation on occupants of the room. When the heat output is high the air flow must be proportionately increased to avoid blowing extremely hot air into the room. High temperature air and heating units are further objectionable in a circulating system of the present type because particles of dust or lint coming in contact with hot units produce an objectionable scorched odor in the air. In the present arrangement the movements of the dampers may be adjusted to correlate exactly with the heat outputs in the different heating steps to maintain a substantially constant temperature of air from the heating chamber under all operating conditions, and to prevent the heating units themselves from attaining a high surface temperature.

By reason of the fact that the motor 53 operates at a constant speed regardless of the heat demand, large loads cannot suddenly be connected or disconnected from the line. On occasions when there is a large heat demand, as when warming up a cold house, the step controller merely operates at its usual speed to move to its "high heat" end position to tilt the heating switches 11 to 18, one after the other. The load is thereby increased step by step in predetermined increments at a predetermined rate until the furnace is delivering its maximum output, which it will continue to do until there is a reduction in the heat demand. When the thermostat responds to temperature rise in the room, the step controller follows in a reverse direction, and as the room approaches the desired temperature the step controller may hunt to modulate the heat output through predetermined increments to maintain an even room temperature until the balance between heat output and heat loss is upset by some external factor such as the opening of an outside door or window. At the same time the air flow is modulated by the damper action in accordance with the large and small movements of the step controller.

A time clock 65 is employed to establish a differential for day and night operation or for otherwise timing the heating period. The numeral 66 indicates a fuse and connector block for the power circuit and the numeral 103 designates a transformer for supplying a low voltage for the motor 53 and associated control circuits. An external conduit connection for power supply is indicated at 67, but this may enter the cabinet at any convenient place.

The dampers 28 are shown open in Figure 2 in approximately the position of maximum air flow for high heat output. Further opening movement of the dampers may be utilized to accommodate the full range of angular motion of the crank arm 55, but such additional opening will not appreciably increase the air flow at the velocities employed. Upon rotation of the cam shaft 52 to reduce the heating effect, the crank arm 55 would rotate to gradually close the dampers until finally they would fully close in the lowest heating step. The position of the linkage in the first or lowest heating step is illustrated diagrammatically in Figure 9, wherein it will be seen that the crank arm 55 is in line with the link 58. In this position of the dampers there is still sufficient air leakage through the damper frame to provide the necessary air flow for the amount of heat produced in this step.

Figure 8 shows the position of the linkage in the "off" end position of the shaft 54 wherein the crank arm 55 has rotated counterclockwise to an over-center position with respect to the link 58 to partially re-open the dampers. This is necessary in order to provide an air supply for emergency operation of the fan in response to an overheated condition when all the heating units are supposedly switched off. My copending application discloses a safety circuit from the bonnet switch 46 to operate the fan independently of the step controller upon the occurrence of an excessive temperature in the heating chamber. If, for example, one or more of the heating units remains energized after the step controller has returned to its "off" end position, an excessive temperature would develop after a time in the heating chamber because, with the fan stopped, there would be no air flow to carry away the heat. This condition might conceivably arise through failure of one of the mercury switches 84 to break the circuit, or through an insulation failure in the wiring. The bonnet switch 46, being directly above the bank of heating units, would respond to such excessive temperature by closing an independent circuit to the fan which would then continue to operate, drawing air through the partially open dampers, as shown in Figure 8, and removing heat from the heating chamber until the temperature is reduced to a safe value. The operation of the fan in this manner would thereby warm the room above its intended temperature, which would serve as a warning that the furnace was operating improperly so that the main switch could be opened and repair effected. If the main switch were not opened or the fault corrected, the fan would continue to operate periodically to dissipate the heat from the heating chamber to prevent a dangerous rise in temperature.

Fan operation through the bonnet switch circuit also occurs under certain conditions of normal operation when there is no fault. In warming up the house in the morning, for example, the highest heating step is usually called for by the room thermostat to produce maximum heat output for a time. Then by the time the house is warm inside the sun may be heating the outside so that once the step controller starts to reduce the heat output it may continue to move directly to its "off" end position and remain there for the rest of the day, thereby stopping the fan. The high heat content of the heating units and heating chamber would then immediately raise the temperature sufficiently to cause the bonnet switch to re-start the fan to remove heat from the heating chamber.

Since the dampers remain partially closed when there is no heat demand, other means must be provided for admitting air for summer ventilation. For this purpose a panel 70 is made removable to provide an air supply for the blower 27 when the heating units are not operating. With this arrangement, cool air from the basement may be circulated into the house for cooling purposes in hot weather, the fan being then operated from a manual switch independent of the control unit.

Other removable panels on the same side of the furnace comprise a panel 71 closing the control housing 32, and a panel 72 closing the terminal housing 42. Also, a removable panel 69 is preferably provided in the heating chamber as shown in Figure 1 for convenience in replacing the heating units. One side of the cabinet may be closed by a continuous permanent panel 73 extending the full height and length of the furnace. If the furnace is positioned near a wall the panel 73 should be assembled on the wall side so as to leave the removable panels 70, 71 and 72 openly accessible.

A feature of the present construction is that the various elements may be reversed side for side as shown in Figure 3 to produce what is herein referred to as a left hand cabinet. The furnace in Figure 3 is made from cabinet parts similar to those used in the furnace in Figure 2, but the continuous panel 73 has been assembled on the left side of the cabinet instead of the right, and the interior components have been shifted to the other side. Thus the control housing 32 and terminal housing 42 have been assembled on the right side with a different control unit and a longer effective length of link 58 being utilized to operate the damper assembly which has been moved by shifting the damper frame 74 on its supporting brackets 75. This reversal of panels will also reverse the heating units end for end because the brackets 37 on the back panel 73 will then be on the left and the terminal housing 42 will be on the right at the end of the control unit housing 32. In this way the present construction is sufficiently flexible to meet not only the expected variations in heating capacity, but also the usual limitations in available basement space found in the average home or building.

In the construction hereinabove described, the blower 27 was driven by a single speed motor 79, and modulation of the air velocity was obtained through movement of dampers 28 by the step controller in accordance with changes in the switching arrangements affecting the heat output. The invention also includes means for modulating the air velocity in accordance with the heat output by varying the speed of the blower and omitting the dampers. Figure 7 shows a control unit 80 for such an arrangement, the step controller having a thermostatically controlled constant speed motor and reduction gear unit 81 driving a cam shaft 82 at a predetermined slow speed as in the previously described control unit 50. One end of the cam shaft 82 is equipped with a plurality of cams 83 for tripping mercury switches 84 to produce control steps in a heating system of variable output in the same manner as cams 51 and switches 11 to 18. The other end of the cam shaft is equipped with a plurality of cams 85 for tripping mercury switches 86 and 87 to operate the blower motor 79 at either low or high speed. In this case the cams 85 are adjusted to trip the switch 86 for low speed operation of the blower just before the first heating circuit is established, and to trip the switch 87 for high speed operation of the blower between preselected intermediate control steps.

Similarly, a three speed fan motor may be operated by the step controller shown in Figure 7 by connecting the switch 86 in the low speed circuit, the switch 87 in the medium speed circuit, and the first one of the bank of switches 84 in the high speed circuit. The various cams are then adjusted so that the switch 86 operates to start the blower just before the first heating circuit is energized, the switch 87 producing an intermediate speed when a portion of the total heat output is being produced, and the third switch producing high speed blower operation for the upper range of heat outputs. With such an arrangement the dampers 28 would be eliminated entirely to leave the air return chamber unobstructed. An additional manual switch would then be provided for summer operation of the blower for cooling and ventilating purposes. The panel 70 could be removed or not at the option of the user, depending upon whether he wished to draw air from the basement or from the house.

Wiring diagrams and switching arrangements for modulating step control of two or three speed blowers in coordination with the heating steps are disclosed in my copending application. In the present Figure 7 it will be noted that there are more switches 84 than necessary for the system described. It is convenient to install the control unit as a standard unit even if all the switches are not needed. Then, if additional heating steps are found necessary, or if a fan with more than three speeds is desired, the additional wiring connections may be made with a minimum of alteration.

Having now described my invention and in what manner the same may be used, what I claim as new and desire to protect by Letters Patent is:

1. An electric furnace comprising a cabinet containing a plenum chamber and an air return chamber in side by side relation therewithin, a blower in said air return chamber for blowing air from said air return chamber through said plenum chamber, a bank of heating units disposed in closely spaced relation across the cross section of said plenum chamber, a single air outlet in said plenum chamber, a filter in said air return chamber, an air inlet for said return chamber having a single source of air supply, and a damper in said inlet to control the rate of air flow produced by said blower.

2. In an electric furnace, a plenum chamber, a fan supplying air to said chamber, a bank of heating units of variable number disposed in closely adjacent side by side relation across a throat in said chamber in good heat transfer relation with all the air leaving said chamber, and an adjustable baffle in said chamber to restrict the throat to the width of said bank to distribute the air flow uniformly over said heating units.

3. In an electric furnace, a plenum chamber having a variable throat, a bank of heating units disposed across said throat, means to vary the heat output of said units, an air return chamber, a blower in said air return chamber for blowing air from said return chamber through said plenum chamber, and means operated by said heat varying means to vary said air flow in accordance with said heat output.

4. An electric furnace comprising a cabinet having an air return chamber and a plenum chamber, a bank of heating units in said plenum chamber, a blower in said return chamber for circulating air over said heating units, a control unit housing in said return chamber, a step controller in said housing having switching means for varying the heat output of said heating units in a sequence of steps, and additional switching means operated by said step controller to vary the speed of said blower in steps between said heating steps.

5. An electric furnace comprising a plenum chamber, a bank of heating units in said chamber, an air return chamber, a blower for blowing air from said return chamber through said plenum chamber and over said heating units, means to vary the heat output of said units, dampers to control the air flow through said chambers, and means operated by said heat varying means to actuate said dampers to vary the air flow in accordance with said heat output.

6. An electric furnace comprising a cabinet having an air return chamber and a plenum chamber, a bank of heating units in said plenum chamber, a blower in said return chamber for circulating air over said heating units, a control unit housing in said return chamber, a step controller in said housing having a rotatable shaft for operating switching means to vary the heat output of said heating units, a damper in said return chamber to vary said air flow, and means operable by said shaft to adjust the position of said damper in accordance with said heat output.

7. In an electric furnace, a plenum chamber, means to blow air through said chamber, a throat in said chamber means to support a bank having a variable number of heating units in closely adjacent side by side relation across said throat in the path of said air flow, and means to vary the width of said throat to make it coextensive with the width of said bank of heating units to direct the entire air flow through said units.

8. In a hot air circulating electric furnace, a heating chamber having a throat outlet, a plurality of heating units arranged in closely adjacent side by side relation entirely across said throat for mutual heat exchange, means to vary the circuit connections to said heating units to cause some units to be heated more than others, and means to blow air through said heating chamber so that all of said air is caused to pass in intimate heat transfer relation with said heating units in said throat for substantially uniform heating of the air regardless of non-uniformity in the relative heating effects produced in different units.

9. In an electric furnace, a vertical plenum chamber, a blower at the bottom of said chamber for blowing air through said chamber, a variable size horizontal bank of heating units at the top of said chamber, and an adjustable baffle in said chamber to distribute said air flow uniformly over said heating units and to form a throat coextensive with the cross sectional area of said bank.

10. In an electric furnace, a cabinet, a vertical partition extending between opposite side walls of said cabinet and dividing the interior space into an air return chamber and a plenum chamber, an opening in the lower portion of said partition, a blower for supplying an air flow through said opening to said plenum chamber from said return chamber, heating unit supports on said side walls for mounting a plurality of elongated heating units in closely adjacent side by side relation parallel with said partition, a baffle curving upwardly from beneath said opening to said supports, and means for adjusting the upper end of said baffle to form a throat for said air flow of a width corresponding to the width of the tank of heating units to pass all of said air flow over said units.

11. An electric furnace comprising a cabinet, a plenum chamber in said cabinet, a bank of heating units in said plenum chamber, an air return chamber in said cabinet, a blower for blowing air from said return chamber through said plenum chamber, a control unit housing in said return chamber, and means for assembling and arranging said units and said chambers so as to mount said control unit housing on either side of said air return chamber.

12. An electric furnace comprising a cabinet, a plenum chamber in said cabinet, a bank of heating units in said chamber, an air return chamber in said cabinet, a blower for supplying air from said return chamber to said plenum chamber, a control unit having switches controlling circuits for said blower and heating units, a housing for said control unit, and means for mounting said housing within said return chamber on either side of said cabinet for access through the adjacent side of said cabinet.

13. An electric furnace comprising a cabinet, a vertical wall in said cabinet dividing the interior space thereof into an air return chamber and a plenum chamber, an opening in the lower portion of said wall, a blower in said air return chamber for supplying air through said opening to said plenum chamber, a bank of heating units in the upper portion of said plenum chamber, a damper in the upper portion of said air return chamber, and a control unit in said return chamber having a common operator for controlling said heating units, said blower and said damper.

14. An electric furnace comprising a cabinet, a vertical wall in said cabinet dividing the interior space thereof into an air return chamber and a plenum chamber, an opening in the lower portion of said wall, a blower in said air return chamber for supplying air through said opening to said plenum chamber, a terminal housing extending along a wall of said cabinet in said plenum chamber, a bank of heating units in said plenum chamber having their terminal ends supported in said terminal housing, a control unit in said return chamber for said blower and heating units, a housing for said control unit extending along said cabinet wall and in communication with said terminal housing for receiving wiring connections therefrom, and means for assembling said cabinet with said terminal housing and control unit housing on either side thereof for access to said control unit and wiring connections.

15. An electric furnace comprising a cabinet, a vertical wall in said cabinet dividing the interior space thereof into an air return chamber and a plenum chamber, an opening in the lower portion of said wall, a blower in said air return chamber for supplying air through said opening to said plenum chamber, a terminal housing in said plenum chamber, a bank of heating units in said plenum chamber having their terminal ends supported in said terminal housing, and a control unit housing in said return chamber in communication with said terminal housing for receiving wiring connections therefrom.

16. In an electric furnace, an air return chamber, a control unit housing extending along one wall of said chamber, a damper frame extending from said housing to the opposite wall of said chamber, a damper mounted in said frame, a step controller in said housing having a rotatable shaft for operating switching means to vary the heat output of the furnace, and means operable by said shaft to vary the damper opening to control an air flow through said chamber.

17. In an electric furnace, an air return chamber, a control unit housing extending along one wall of said chamber, a damper frame extending from said housing to the opposite wall of said chamber, a damper mounted in said frame, a step controller in said housing having a rotatable shaft for operating switching means to vary the heat output of the furnace, means operable by said shaft to vary the damper opening to control and air flow through said chamber, and means for mounting said damper frame and control unit housing on opposite sides of said chamber in interchanged positions to provide either a right hand or left hand furnace.

18. In an electric furnace, a cabinet, a heating chamber in said cabinet, a plurality of elongated finned heating units in said chamber, a terminal housing extending along one side of said heating chamber to support the terminal ends of said units in closely adjacent side by side relation, an elongated opening in said housing receiving said terminal ends therethrough and being closed by the fins on said units to shield wiring connections in said housing from the heat in said heating chamber, and means for mounting said terminal housing on either one of two opposite sides of said cabinet.

19. In a heating and ventilating unit, a heating chamber, means to create an air flow through said heating chamber, damper means to control said air flow, and a controller for varying the heat output of said heating chamber in various degrees between a lowest heating step and a highest heating step and for coordinately moving said damper means between a position of minimum opening and a position of maximum opening, said damper means being in said position of maximum opening in the highest step and being in the position of minimum opening in the lowest heating step, and said controller further having an off position in which no heat is produced in said heating chamber and said dampers are again partially open.

20. In a heating and ventilating unit, a heating chamber, means for creating an air flow through said heating chamber, damper means for controlling said air flow, and a controller having a rotatable shaft for adjusting said damper means and for varying the heat output in said heating chamber in a range of movements between an off position and a maximum heat position, said damper means being operated by a crank arm on said rotatable shaft arranged to open said dampers in the high heat and off positions of said shaft and to close said dampers to a minimum opening in the lowest heating position of said shaft.

RILEY H. TAYLOR.

REFERENCES CITED

The following references are of record in the file of this patent:

UNITED STATES PATENTS

| Number | Name | Date |
|---|---|---|
| 1,664,229 | Staege | Mar. 27, 1928 |
| 1,993,521 | Parsons | Mar. 5, 1935 |
| 2,095,824 | McMahan | Oct. 12, 1937 |
| 2,137,833 | Crago | Nov. 22, 1938 |